(12) United States Patent
Lerner et al.

(10) Patent No.: US 7,533,190 B2
(45) Date of Patent: May 12, 2009

(54) NETWORK STORAGE TARGET BOOT AND NETWORK CONNECTIVITY THROUGH A COMMON NETWORK DEVICE

(75) Inventors: David M. Lerner, Hillsboro, OR (US); Dave Matheny, Cedar Park, TX (US); Douglas D. Boom, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1094 days.

(21) Appl. No.: 10/822,168

(22) Filed: Apr. 8, 2004

(65) Prior Publication Data

US 2005/0228903 A1    Oct. 13, 2005

(51) Int. Cl.
*G06F 15/16* (2006.01)
*G06F 15/173* (2006.01)
*G06F 15/177* (2006.01)

(52) U.S. Cl. .......................... 709/250; 709/217; 713/2; 710/6

(58) Field of Classification Search ......... 709/200–203, 709/217–220, 248–253
See application file for complete search history.

(56) References Cited

U.S. PATENT DOCUMENTS 5,734,828 A      3/1998  Pendse et al.
7,127,602 B1 *  10/2006  Bakke et al. .................... 713/2
7,155,492 B2 *  12/2006  Obara et al. ................ 709/217
7,177,913 B2 *   2/2007  Connor ........................ 709/212
7,360,072 B1 *   4/2008  Soltis et al. ..................... 713/2
2004/0111537 A1* 6/2004  Connor et al. ................. 710/6
2005/0138346 A1* 6/2005  Cauthron ....................... 713/2
2005/0228903 A1* 10/2005  Lerner et al. ................ 709/250

* cited by examiner

*Primary Examiner*—Haresh N Patel
(74) *Attorney, Agent, or Firm*—Christopher K. Gagne (57) ABSTRACT

The present disclosure includes systems and techniques relating to booting to a network storage target. In general, in one implementation, a bus-to-network device driver is loaded during a machine boot, where the bus-to-network device driver is capable of sending machine bus commands over a network, providing access to the network for a network device driver, and distinguishing between received responses to the machine bus commands and other network traffic corresponding to the network device driver. Loading of the bus-to-network device driver can occur in response to an operating system load of bus drivers. For example, the bus-to-network device driver can be an iSCSI driver, and the operating system load of bus drivers can be the operating system load of SCSI drivers.

19 Claims, 6 Drawing Sheets

NETWORK STORAGE TARGET BOOT AND NETWORK CONNECTIVITY THROUGH A COMMON NETWORK DEVICE

BACKGROUND

In current data processing machines, network connectivity is typically handled by an operating system after disk access is established. A network device driver is typically loaded from information stored on a boot disk during a machine boot, and the loaded network device driver is used by the operating system to control a network interface card after the booting process is completed. In many modern operating systems, computers also go through a process of switching from a mode where executables have direct access to hardware to a mode where the operating system controls the hardware, and drivers interact through a structure determined by the operating system.

Details of one or more embodiments are set forth in the accompanying drawings, where like reference numerals indicate like elements, and the description below. Other features and advantages may be apparent from the description and drawings, and from the claims.

DETAILED DESCRIPTION

Figure 1:
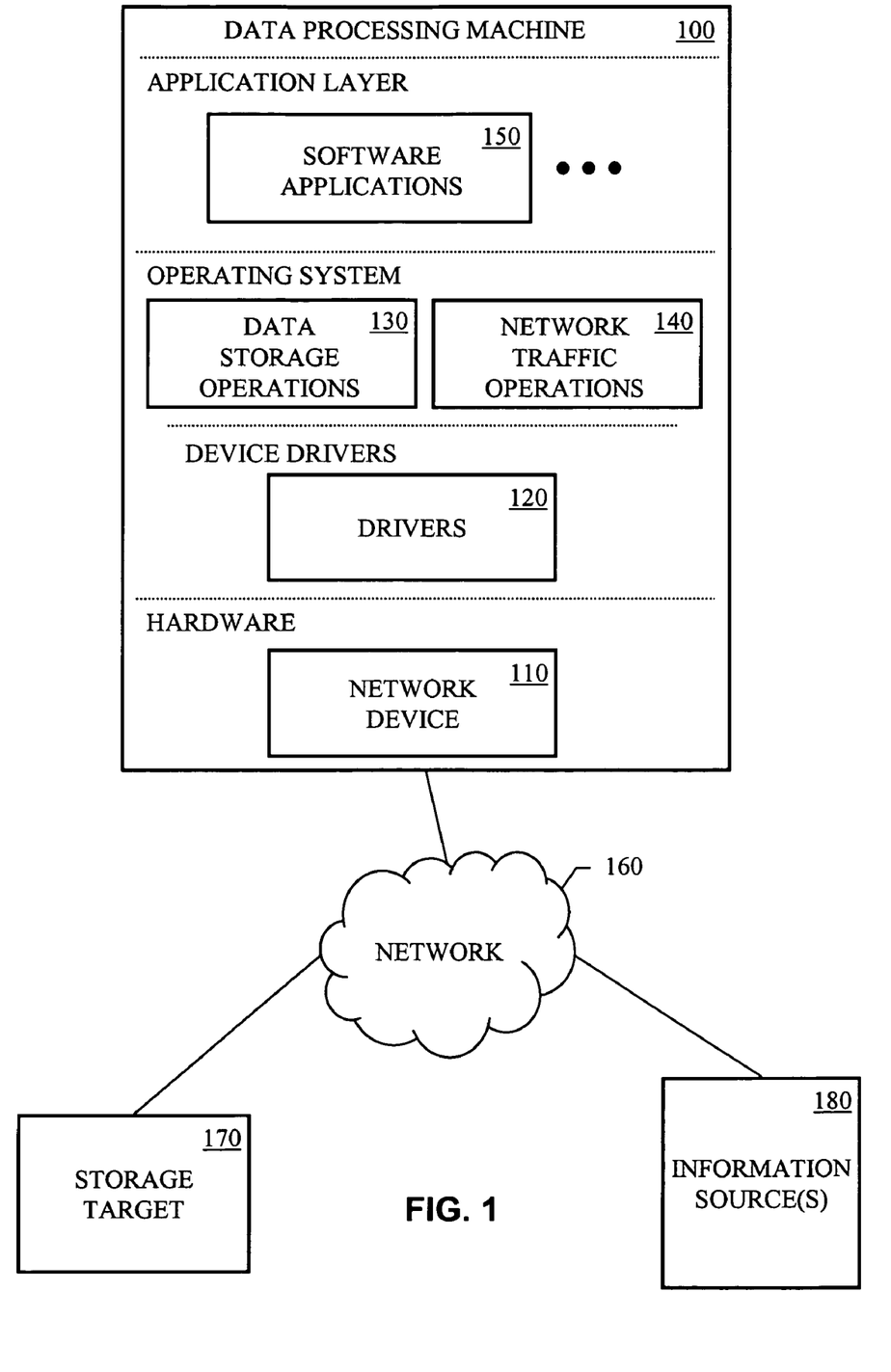
FIG. 1 is a block diagram illustrating a system that provides network storage target boot and network connectivity through a common network device.

FIG. 1 is a block diagram illustrating a system that provides network storage target boot and network connectivity through a common network device. A data processing machine 100 includes a network device 110 that connects the machine 100 to a network 160. The machine 100 may be a personal computer, a server, a mobile consumer electronic device, or other data processing machine. The network 160 may be a local area network, metropolitan area network, wide area network, or other type of machine network. The network 160 may be a wired or wireless machine network and may use a connectionless packet-switched protocol, such as Internet Protocol (IP), and/or other network protocols. The network device 110 represents a hardware component of the machine 100 and may be a network interface card (NIC) or an integrated network device (e.g., a network adapter built into a main circuit board, such as a motherboard, of the machine 100).

Drivers 120 control the network device 110, providing a conduit through which an operating system (OS) and one or more software applications 150 in an application layer of the machine 100 may communicate with the network 160. The drivers 120 allow data storage operations 130 to be performed over the network 160 using the network device 110. For example, the drivers 120 may include an iSCSI initiator that allows SCSI commands to interact with a storage target 170 over the network 160.

At least one of the drivers 120 may support booting to the storage target 170 over the network 160, in which case the storage target 170 represents a remote boot device. A boot device is a device that is initialized before loading of an operating system. The remote boot device 170 is remote in that the boot device 170 is accessed over a network and may be located in physical space either close to or far away from the machine 100. For example, the remote boot device 170 may be connected to the machine 100 through a local area network 160 (e.g., a gigabit Ethernet) and may be located in the same building, rack, or cabinet as the machine 100.

Additionally, the drivers 120 allow network traffic operations 140 to be performed over the network 160 using the network device 110. At least one of the drivers 120 may present itself as a network device driver to the operating system and support general purpose network traffic. Thus, the operating system may view and interact with one of the drivers 120 as though it were a conventional network device driver loaded after bus drivers and storage drivers in the machine boot process. The network traffic supported may include multiple different networking protocols, such as TCP/IP, ODI (Open Data-link Interface), PXE (Pre-Boot Execution Environment), and various other standardized and/or company/operating system based networking protocols, depending upon implementation. In general, the drivers 120 allow the machine 100 to communicate with one or more information sources 180 using multiple networking protocols.

Although the device drivers of the machine 100 appear in FIG. 1 to be in a layer separate from the operating system and the hardware, it should be understood that the device drivers may operate in different contexts within the machine 100 depending upon implementation and the state of operation, from power off, through the boot sequence, up until an operational mode is reached, where the operating system is fully loaded and in control of the machine 100. Moreover, various driver functions described herein can be implemented in hardware, firmware and/or software.

As described above, the drivers 120 may support booting to a remote boot device and support general purpose network traffic, while at least one of the drivers 120 presents itself as a network device driver to the operating system. Booting to the remote boot device may be done using iSCSI, where SCSI commands are encapsulated in the TCP/IP protocol. An iSCSI boot typically involves booting through one or more (usually two) iSCSI initiators to an iSCSI target. An iSCSI initiator is the requestor/recipient of data from an iSCSI target, and the iSCSI target typically either has, or translates disk accesses and serves initiators. In the case of two iSCSI initiators, the first initiator may reside in firmware or be delivered through PXE. The second initiator may interface with the operating system to which the machine 100 is booting.

An iSCSI boot generally needs a functional network connection before the boot device can be established, which is out of order for many operating systems. Moreover, many operating systems are not protected against the user disabling the network connection during use, as this is not generally a fatal error under normal operation. However, if the machine is in an iSCSI boot configuration, these normal unprotected operations may lead to system halts and crashes in conventional data processing machines running conventional operating systems.

In the machine 100, these problems may be overcome by using a device driver architecture that employs a virtual network device driver. The device driver architecture may provide a structure for a driver interface that allows the network device 110 to be dual purposed for network storage target boot (e.g., iSCSI boot) and general purpose network connectivity (e.g., general purpose network traffic from software applications 150). Moreover, the device driver architecture may interface with the operating system (OS) so as to provide seamless OS integration. The driver structure may integrate with most current operating systems without requiring any changes from the OS vendors, as described further below.

The device driver architecture allows the network device 110 to access the network 160 and connect to the storage target 170 (e.g., a network disk drive) before the operating system loads its own network stack. This may be done when the operating system loads bus drivers (e.g., SCSI drivers). For example, many current operating systems allow the addition of third party SCSI drivers at a SCSI driver insertion point, and the drivers 120 can hook in at this point in the boot up sequence, potentially making the installation process very easy.

In addition, one of the drivers 120 may be a virtual driver provided to the operating system of the machine 100, allowing the operating system to use the network device 110 for network access via the virtual driver. The virtual driver does not communicate directly to hardware, but rather communicates to an interface that is part of a remaining device driver 120. This allows the operating system to manage the network interface using for instance unprotected operations that would otherwise crash the machine 100. The network interface functions after disk access is established, and the network interface may be enabled and disabled without harming the machine's ability to communicate with a storage drive.

Figure 2:
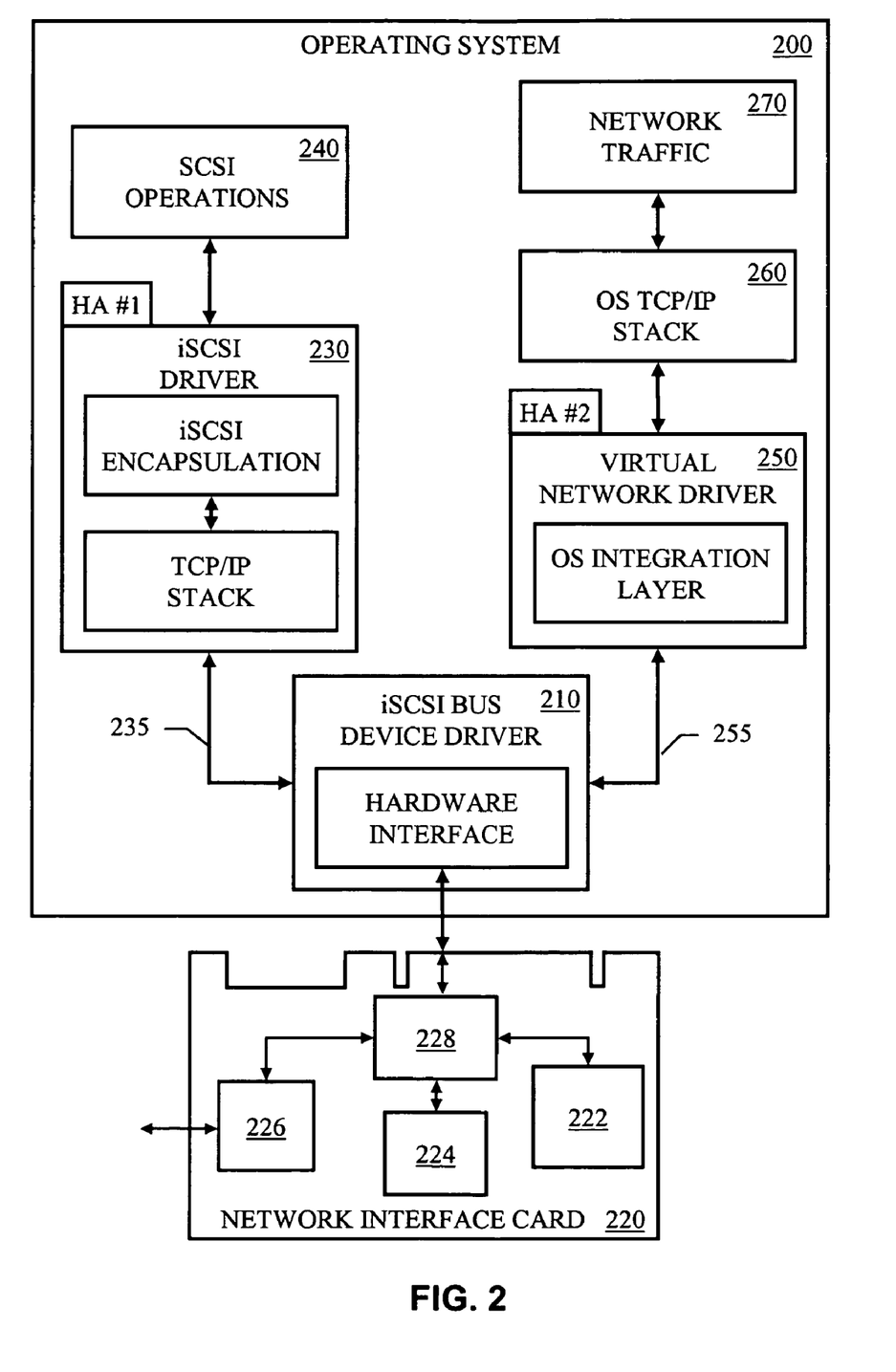
FIG. 2 is a block diagram illustrating an example implementation of the system from FIG. 1 in the context of iSCSI (Small Computer System Interface over TCP/IP (Transmission Control Protocol/Internet Protocol)).

FIG. 2 is a block diagram illustrating an example implementation of the system from FIG. 1 in the context of iSCSI. An operating system 200 has been fully loaded, and an intermediary driver 210, e.g., an iSCSI bus device driver, includes a hardware interface that communicates with a network interface card (NIC) 220. The NIC 220 may include integration circuitry 228, which may include an ASIC (Application Specific Integrated Circuit). The NIC 220 may include a processor 222, a non-volatile memory 224 (e.g., an option ROM), and a network interface 226.

An iSCSI driver 230 may contain its own TCP/IP stack and iSCSI encapsulation component, enabling the iSCSI driver 230 to be self sufficient for network connectivity, supporting SCSI operations 240 over a network. The iSCSI driver 230 appears as a SCSI driver to the operating system 200 and generates iSCSI traffic 235 in response to the SCSI operations 240. Installation of the iSCSI driver 230 during a machine boot can cause installation of the iSCSI bus device driver 210. In many current operating systems, bus drivers are loaded even before disk drivers.

A virtual network driver 250 also communicates with the iSCSI bus device driver 210. A network stack, such as an OS TCP/IP stack 260, may be determined by the operating system 200. The virtual network driver 250 may include a hardware interface pass through or an OS integration layer that assists in making the virtual network driver 250 appear as a conventional network device driver to the operating system 200. In some implementations, the operating system 200 need not be changed to accommodate the driver architecture. The driver architecture may be used with many current operating systems with essentially no changes to the operating systems (e.g., no OS modifications other than standard network and SCSI driver installs; the existing shut down routines need not be changed), thus providing seamless operating system integration.

Because the machine does not rely on the virtual network driver 250 for disk access, the virtual network driver 250 may be loaded and unloaded as the user or operating system determines. Network traffic 270 passes through the virtual network driver 250, providing network traffic 255 to the iSCSI bus device driver 210. The NIC 220 may be operationally disabled from within the operating system 200, cutting off the network traffic 255, and yet the NIC 220 still remains operational for iSCSI traffic 235.

In this driver architecture, the device driver that controls the hardware interface (e.g., the iSCSI bus device driver 210 in FIG. 2) distinguishes between received responses to machine bus commands and other network traffic. The hardware interface driver may determine the difference between packets destined for an iSCSI stack and packets destined for a general network stack. This can be accomplished by assigning the iSCSI driver 230 and the virtual network driver 250 their own separate hardware addresses (HA #1 and HA #2). For example, the two drivers 230, 250 may each be assigned their own MAC (Media Access Control) address.

By assigning two different hardware addresses, traffic can be easily routed as appropriate. Additionally, the NIC 220 may be assigned two IP addresses, one for each hardware address. This allows the iSCSI bus device driver 210 to route traffic to and from the appropriate network stack, and may provide additional advantages as described further below in connection with FIG. 7. Alternatively, the hardware interface controlling driver may distinguish between received responses based on port number; a fixed number of predefined port numbers may be assigned to a defined set of storage targets, and these predefined port numbers may be used to identify packets corresponding to machine bus commands.

Figure 3:
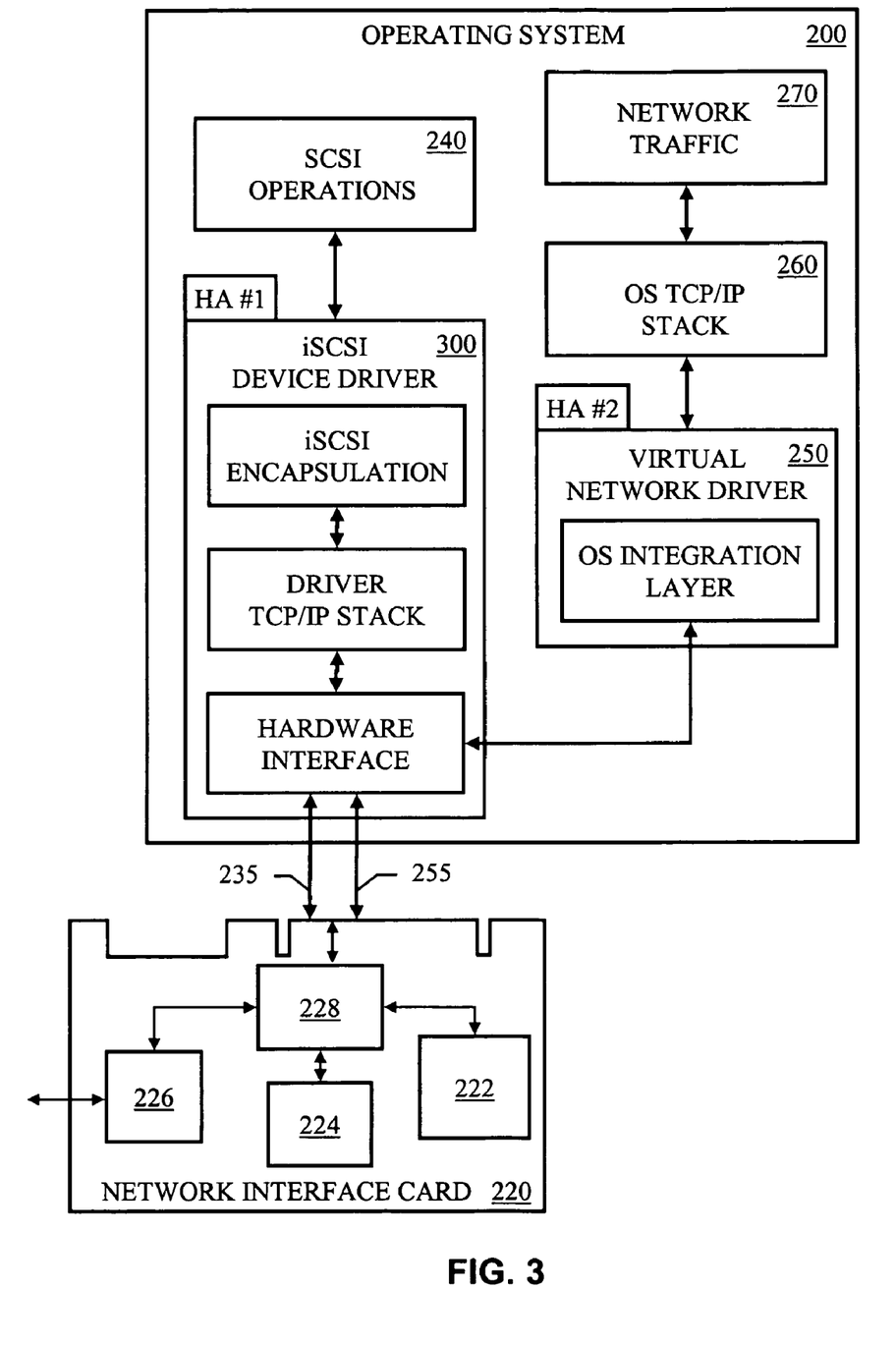
FIG. 3 is a block diagram illustrating another example implementation of the system from FIG. 1 in the context of iSCSI.

FIG. 3 is a block diagram illustrating another example implementation of the system from FIG. 1 in the context of iSCSI. In this implementation, the iSCSI driver 230 and iSCSI bus device driver 210 from FIG. 2 are merged, and the virtual network driver 250 communicates directly with the new iSCSI device driver 300. The choice of implementation may be different for different operating systems, but the idea of a virtual network driver using an intermediary device driver to communicate with the network device remains the same.

Figure 4:
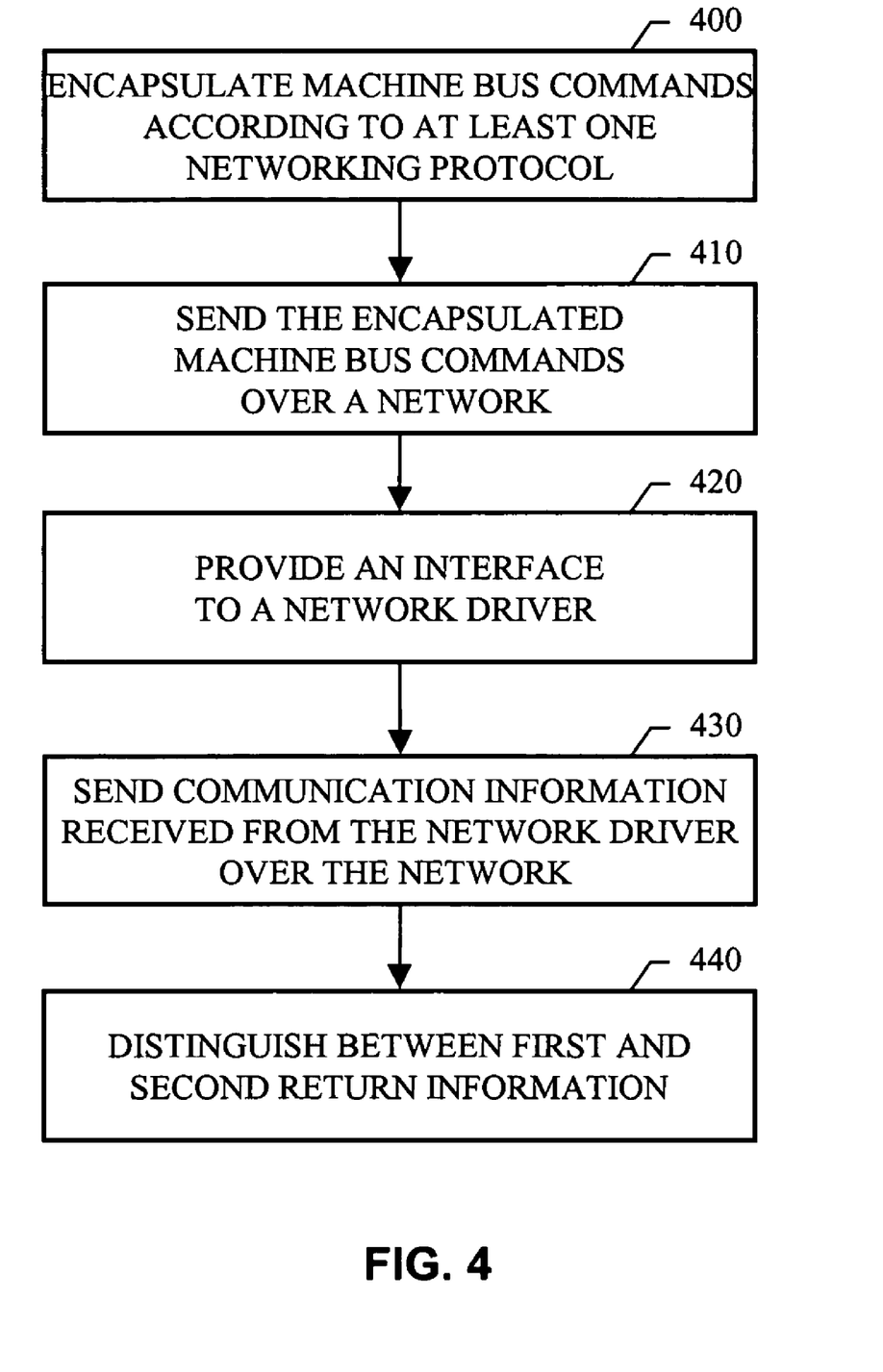
FIG. 4 is a flow chart illustrating operations performed by a bus-to-network device driver.

FIG. 4 is a flow chart illustrating operations performed by a bus-to-network device driver. Machine bus commands are encapsulated according to at least one networking protocol at 400. The encapsulated machine bus commands are sent over a network at 410. An interface to a network driver is provided at 420. Communication information received from the network driver is sent over the network at 430. First and second return information received in response to the encapsulated machine bus commands and the communication information respectively are distinguished at 440.

Figure 5:
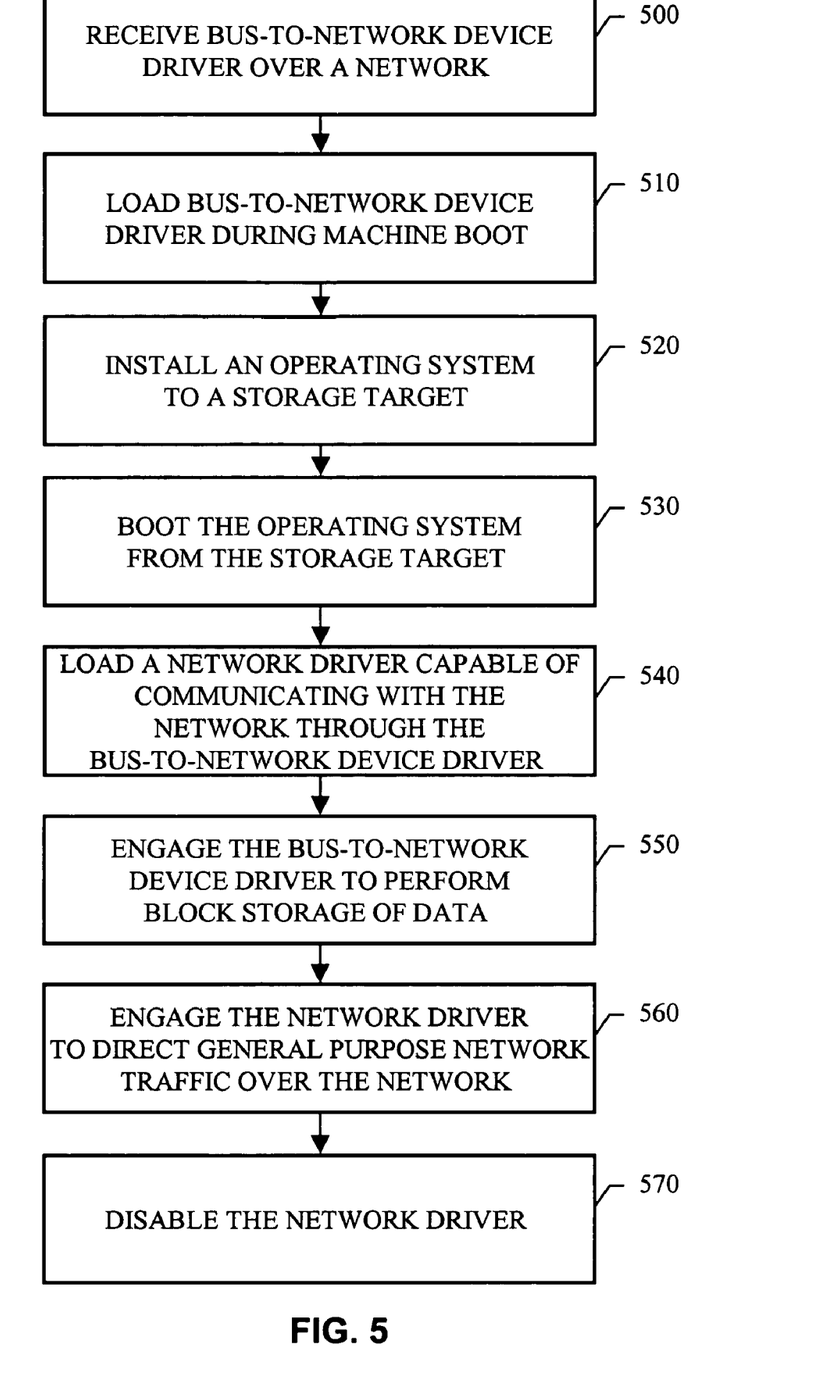
FIG. 5 is a flow chart illustrating various approaches to using a bus-to-network device driver in a data processing machine, where various operations may be used separately or in combination.

FIG. 5 is a flow chart illustrating various approaches to using a bus-to-network device driver in a data processing machine, where various operations may be used separately or in combination. A bus-to-network device driver may be received over a network at 500. For example, PXE may be used to obtain the bus-to-network device driver. A bus-to-network device driver is loaded during a machine boot at 510, such as described above. An OS may be installed to a storage target at 520. For example, the OS may be installed to the storage target before booting to the storage target, such as by using PXE through the iSCSI device driver to put the OS on an iSCSI hard drive. A boot to an OS on the storage target occurs at 530. For example, the machine boot may be to an OS on the iSCSI hard drive, which may be an OS installed to the target at 520.

A network driver capable of communicating with the network through the bus-to-network device driver is loaded at 540. After the machine boot is completed, the bus-to-network device driver is engaged to perform block storage of data at 550. The network driver is engaged to direct general purpose network traffic over the network at 560. Moreover, the network driver may be disabled at 570. For example, the OS can turn off the network connection without disconnecting the iSCSI drive.

Using the example systems of FIGS. 2 and 3, a data processing machine may boot to a remote drive on an iSCSI target, and thus a machine may boot up without using a local drive. The remote drive may be viewed within the machine as a local SCSI disk. Using the described driver architecture, the general network interface and the iSCSI interface of a machine may be shared. Thus, two different TCP/IP stacks may be used at the same time for two different types of traffic through a shared network device.

Command oriented bus/drive interfaces, such as SCSI, are generally very stateful, as compared with action oriented interfaces, such as the IDE (Integrated Drive Electronics) interface. Thus, loss of a network connection in a machine that uses a bus-to-network interface, such as iSCSI, can result in a system crash. Using a virtual network driver as described allows a bus-to-network interface to maintain a network connection through a shared network device, while the network connectivity governed by the operating system may freely go up and down, providing valuable backward compatibility for existing operating systems. Moreover, in the case of a system where all storage access is through a network, the driver that controls the network device should remain up constantly while the storage target is in use, including during a handoff between the boot initiator and the operating system initiator, which the present systems and techniques enable.

Figure 6:
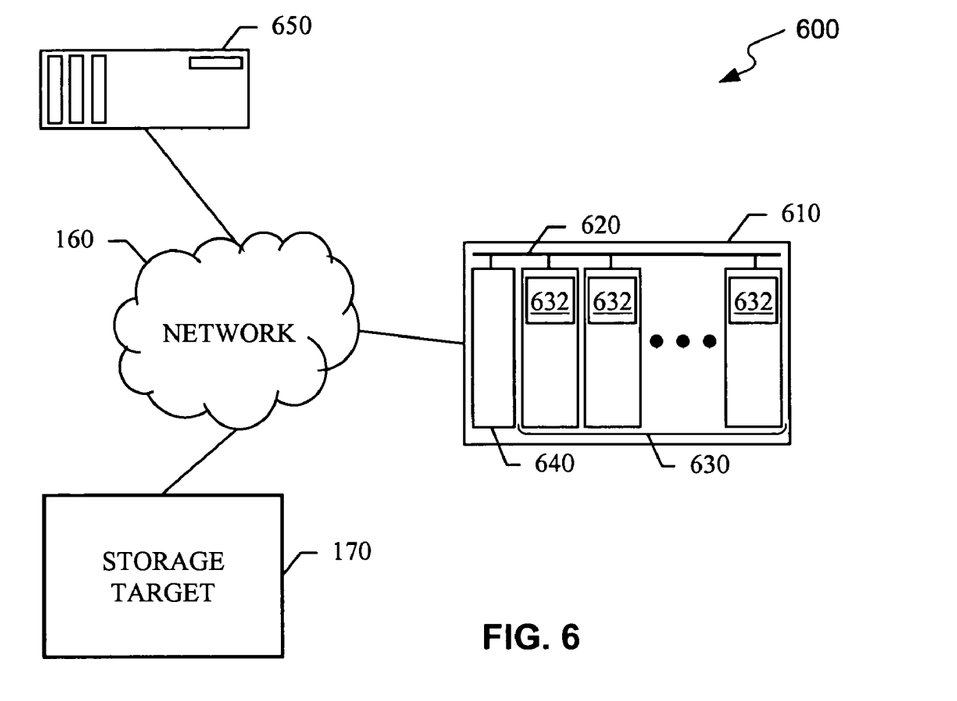
FIG. 6 is a block diagram illustrating another system that provides network storage target boot and network connectivity through a common network device.

FIG. 6 is a block diagram illustrating another system that provides network storage target boot and network connectivity through a common network device. A system 600 includes a network 160 and a storage target 170, such as in the system of FIG. 1. Additionally, the system 600 includes a modular platform 610. The modular platform 610 includes a main circuit board 640 and at least one local system bus 620, which may be part of the main circuit board 640.

The modular platform 610 includes multiple modular elements 630, each modular element 630 being removably coupled with the at least one local system bus 620. The modular elements 630 may have similar operational interfaces, yet provide different functions within the modular platform 610. For example, the modular platform 610 may be modular communications platform, such as a network server having interchangeable cards, which may be compliant with the ATCA (Advanced Telecom Computing Architecture) standard.

The modular elements 630 may each include a processor 632. For example, the modular elements 630 may be blade servers. Moreover, the processors 632 may be uniprocessors or multiprocessors, and may also employ various advanced processor architecture features, such as super-pipelining and/or hyperthreading.

The modular platform 610 includes a network device, such as a network device integrated into the main circuit board 640, and the modular platform 610 employs the bus-to-network driver architecture, as described above. The network device in the modular platform 610 may include first and second hardware addresses assignable to a device driver and a network driver respectively. In addition, one of the information sources available over the network 160 may be a dynamic host configuration protocol (DHCP) server 650 available over a local area network, and the DHCP server 650 may interact with the modular platform 610 using the first and second hardware addresses.

Figure 7:
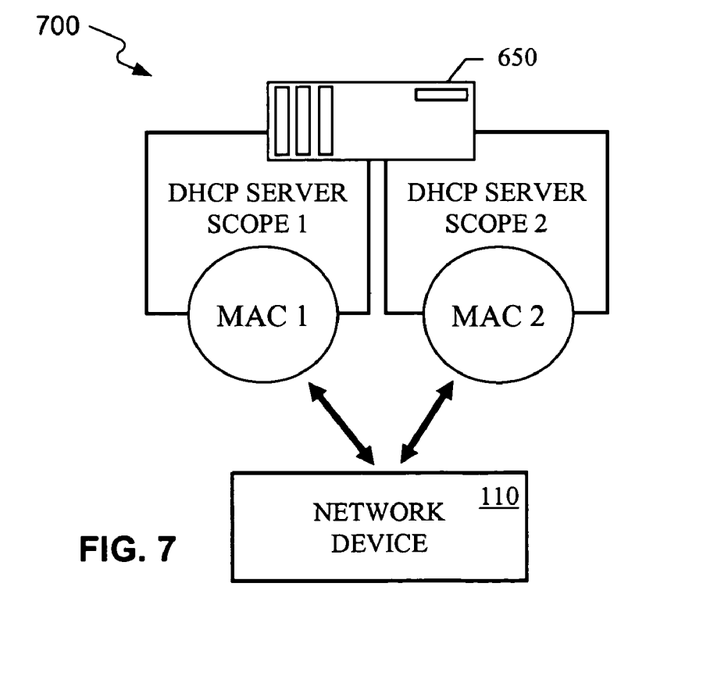
FIG. 7 is a block diagram illustrating an example dynamic host configuration protocol server implementation.

FIG. 7 is a block diagram illustrating an example dynamic host configuration protocol server implementation 700. The DHCP server 650 includes a server scope 1 and a server scope 2. The first server scope may include a single network address keyed to the first hardware address (e.g., MAC address 1) of the network device 110. The second server scope may include a range of network addresses keyed to exclude the first hardware address of the network device 110, thus allowing multiple network addresses to be assigned to the second hardware address (e.g., MAC address 2). The network addresses may be IP addresses, and the DHCP server 650 may also assign iSCSI boot variables in the first scope and assign network variables in the second scope.

The logic flows depicted in FIGS. 4 and 5 do not require the particular order shown. Not all the operations illustrated need to be performed to achieve desirable results. Moreover, performing the operations in sequential order is not required.

Other embodiments may be within the scope of the following claims.

What is claimed is:

1. A machine-implemented method comprising:
   loading in a machine a bus-to-network device driver during a machine boot, the bus-to-network device driver distinguishing between received responses to machine bus commands and other network traffic, the other network traffic being passed through a virtual network driver provided to an operating system protocol stack of the machine, the machine bus commands being passed through a storage protocol driver, the received responses to the machine bus commands being received by the machine via a network, both the other network traffic and the received responses being passed through the bus-to-network device driver, the bus-to-network device driver to select one of the virtual network driver and the storage protocol driver to which to pass the received responses and the other network traffic based upon respective hardware addresses associated with the storage protocol driver and the virtual network driver, wherein the bus-to-network device driver comprises an iSCSI driver and the loading occurs in response to an operating system load of SCSI drivers.

2. The method of claim 1, the bus-to-network device driver further capable of sending machine bus commands over the network and providing access to the network for the virtual network driver, and wherein said loading the bus-to-network device driver occurs in response to an operating system load of bus drivers.

3. The method of claim 1, wherein said loading the bus-to-network device driver comprises:
   loading a first bus-to-network driver that controls a network device; and
   loading a second bus-to-network driver that encapsulates the machine bus commands, includes a network stack and interfaces with the network through the first bus-to-network driver.

4. The method of claim 1, further comprising loading the virtual network driver capable of communicating with the network through the bus-to-network device driver.

5. The method of claim 4, farther comprising disabling the virtual network driver, said disabling cuffing off general purpose network traffic but having no effect on the bus-to-network device driver's sending of the machine bus commands.

6. The method of claim 4, further comprising:
engaging the bus-to-network device driver to perform block storage of data to a storage target over the network using a connectionless packet-switched communication protocol; and
engaging the virtual network driver to direct general purpose network traffic over the network.

7. The method of claim 6, wherein the general purpose network traffic comprises TCP/IP traffic.

8. The method of claim 1, wherein the hardware addresses comprise MAC addresses.

9. The method of claim 1, further comprising:
installing an operating system to a storage target; and
booting the operating system from the storage target, said loading occurring during said booting.

10. The method of claim 1, wherein the bus-to-network device driver comprises a portion of a boot loader.

11. The method of claim 1, wherein said loading comprises loading the bus-to-network device driver during multiple machine boots of multiple data processing machines.

12. The method of claim 11, wherein the multiple data processing machines comprise at least one modular platform.

13. An apparatus comprising:
a network device;
a bus-to-network device driver that operates the network device and supports booting to a remote boot device, the bus-to-network device driver distinguishing between received responses to machine bus commands and general purpose network traffic; and
a virtual network driver that communicates with the network device through the device driver, presents itself to an operating system protocol stack as a network device driver that operates the network device, and supports the general purpose network traffic;
the general network traffic being passed through the virtual network driver, the machine bus commands being passed through a storage protocol driver, the received responses to the machine bus commands being received via a network, both the general purpose network traffic and the received responses being passed through the bus-to-network device driver, the bus-to-network device driver to select one of the virtual network driver and the storage protocol driver to which to pass the received responses and the general purpose network traffic based upon respective hardware addresses associated with the storage protocol driver and the virtual network driver, wherein the bus-to-network driver comprises an iSCSI driver that presents itself as a SCSI driver to the operating system.

14. The apparatus of claim 13, wherein the bus-to-network driver is loaded during booting in response to an operating system load of bus drivers.

15. The apparatus of claim 14, wherein the bus-to-network device driver further comprises a hardware driver that operates the network device, and the bus-to-network driver communicates with the network device through the hardware driver and presents itself as a bus driver to the operating system.

16. The apparatus of claim 15, wherein the hardware driver discriminates between iSCSI traffic and the general purpose network traffic based on the hardware addresses.

17. The apparatus of claim 16, wherein the hardware addresses comprise MAC addresses.

18. The apparatus of claim 13, wherein the network device comprises a network interface card.

19. The apparatus of claim 18, wherein the device driver comprises a portion of code tangibly embodied in an option ROM of the network interface card.

* * * * *

UNITED STATES PATENT AND TRADEMARK OFFICE
CERTIFICATE OF CORRECTION

| | | |
|---|---|---|
| PATENT NO. | : 7,533,190 B2 | Page 1 of 1 |
| APPLICATION NO. | : 10/822168 | |
| DATED | : May 12, 2009 | |
| INVENTOR(S) | : David M. Lerner et al. | |

It is certified that error appears in the above-identified patent and that said Letters Patent is hereby corrected as shown below:

In column 7, line 1, in Claim 5, delete "farther" and insert -- further --, therefor.

In column 7, line 2, in Claim 5, delete "cuffing" and insert -- cutting --, therefor.

Signed and Sealed this

Fourteenth Day of July, 2009

JOHN DOLL
*Acting Director of the United States Patent and Trademark Office*